Feb. 26, 1963  J. BROCK  3,078,924
TOE-WEIGHT ASSEMBLY FOR HORSES
Filed Sept. 2, 1959
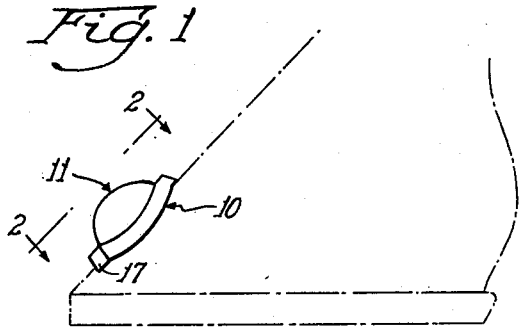
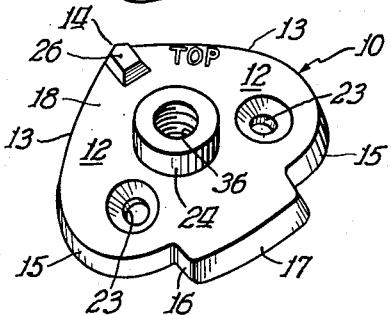
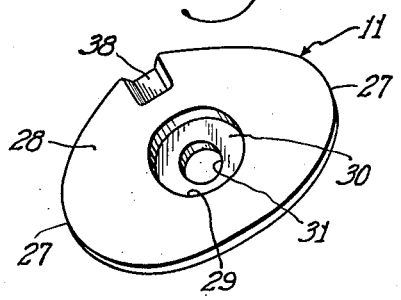
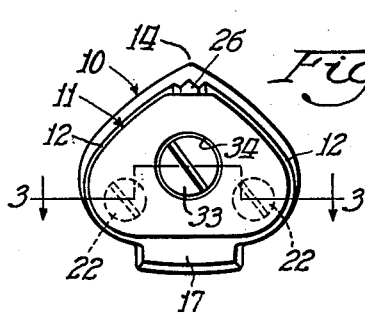
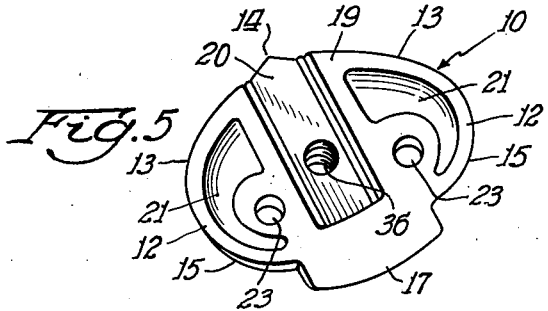
Inventor:
Joseph Brock
By: H. J. Schmid Atty

United States Patent Office 3,078,924
Patented Feb. 26, 1963

3,078,924
TOE-WEIGHT ASSEMBLY FOR HORSES
Joseph Brock, 1900 River Road, Melrose Park, Ill.
Filed Sept. 2, 1959, Ser. No. 837,701
2 Claims. (Cl. 168—25)

This invention relates to an improved toe-weight assembly for horses and adapted to employ readily attachable and removable blocks or bodies of different weights.

Toe-weights are universally and commonly used at present in the form of a base or back member of rectangular shape connected by screws to the horse's hoof, the back member having a tongue projecting upwardly along the hoof and through a passage in a weight body or block which is formed with a rectangular recess, below the passage, receiving the similarly shaped back member. A wire is inserted into an opening in the upper end of the tongue of the back member to retain the block in assembly with the back member. The wire may be detached to permit removal of the block, or to permit another block of different weight to be assembled with the back member.

Usage of such toe-weights have several disadvantages. For example, jarring of the toe-weight during pacing or trotting frequently causes the blocks to be moved relative to the base member in a manner subjecting the retaining wire to hammer-like blows by the blocks until the wire breaks when the block may be thrown with considerable force away from the horse's hoof with consequent possible serious injury to the horse, driver, or spectators. Also, such violent and abrupt movement of the block relative to the base member may cause loosening of the screw attachment of the toe-weight base member to the hoof so that the entire toe-weight assembly is freed and forcibly thrown from the horse's hoof.

It is an object of the invention to provide an improved toe-weight assembly for horses which is readily attachable and removable to a horse's hoof and having means for detachably securing blocks of different weights in a manner positively preventing unwanted dislodgement of the weight block.

Another object of the invention is to provide an improved toe-weight assembly for horses having a base member of such shape as to conform to varying shapes of horses' hoofs for secure attachment thereto; a weight block fitting on the base member; and novel means for insuring retention and immobility of the block on the base member during usage of the toe-weight assembly.

Another object of the invention is to provide an improved toe-weight assembly for horses characterized by the simplicity of its parts and assembly; adaptability to differing shapes of horses' hoofs; its strength and durability; and its ready and economical manufacture.

These and other objects of the invention will become more fully apparent by reference to the appended claims and as the following detailed description proceeds with reference to the accompanying drawing in which:

FIG. 1 is a side elevational view of the preferred form of my toe-weight assembly applied upon the hoof of a horse;

FIG. 2 is a front face or elevational view of the toe-weight assembly, as indicated by the line 2—2 of FIG. 1;

FIG. 3 is a transverse sectional view of the toe-weight assembly, said view being taken on line 3—3 of FIG. 2;

FIGS. 4 and 5 are perspective views of the base member of the toe-weight assembly and respectively showing details of the front and rear faces of the base member; and FIG. 6 is a perspective view of the weight block of the assembly and showing details of the rear face of the block.

The preferred form of my toe-weight assembly comprises two principal components in the form of a base member generally indicated 10 and a weight member generally indicated 11. In general and as shown in FIG. 1, the base member 10 is adapted to be detachably secured to the horse's hoof and the weight member is firmly but removably connected to the base member.

More particularly, the base member comprises a plate formed of metal, such as bronze, which may be molded by casting or drop forging to assume the illustrated shape of the plate. The base plate 10 has a pointed spade-like contour provided by two wing portions 12, 12 having edges 13, 13 extending upwardly from a horizontal plane at the widest point of the plate and angularly inclined toward each other to intersect at the vertex or peak 14 of the plate, the wing portions 12, 12 further having arcuately shaped edges 15, 15 merging at their upper ends and forming continuations of the edges 13, 13 and at their lower ends with the U-shaped edge 16 of a downwardly projecting portion 17, as shown in FIGS. 2 and 4.

The front face 18 of the plate has a generally convex curvature and its rear face 19 has a generally concave curvature between the lateral edges thereof, the radii of the concave curvature of the rear face varying in length transversely of the plate from the top to the bottom thereof and having a gradually decreasing curvature from top to bottom, to conform to and be complementary to the varying radii of curvature of the toe portion of the largest hoof to which the plate is fitted, as shown in FIG. 3. In addition to insure proper and easy fitting of the plate 10 to toe portions of smaller hoofs and also to irregularities in misshapen and faulty shaped hoof toe portions, it is important to note that the rear or back face 19 of the plate is provided with a vertically extending and centrally located wide channel defined by a rectangular rabbet or groove 20 and arcuate recesses 21, 21 on opposite sides thereof which afford substantially large spaces providing ample clearance for accommodating different curvatures of varying size hoof toe portions and also any deformities or irregular shaped portions of the front surfaces of hoofs. With particular reference to situations where the plates are to be applied to toe portions or hoofs of smaller radii of curvature than that of the rear face of the plate as shown in FIG. 3, the channel 20 in the plate is important as the channel compensates for and accommodates such toe portions to afford proper fitting of the plate to the toe, as shown in FIG. 3. It will be apparent that a sufficiently large curved remaining surface of the plate's back face, including the downwardly projecting portion 17, below the lower end of the groove 20, is present to provide satisfactory supporting engagement with the convex face of the toe portion of a horse's hoof and to maintain it in proper position when the plate is placed on the hoof and secured thereto by a pair of screws 22, 22. The screws 22, 22 extend through spaced circular openings 23, 23 on opposite sides of the slot 20 in the plate, the side walls of the openings being angularly inclined toward each other insuring the proper engagement of the curved surfaces of the rear face of the plate and the horse's hoof toe portion. The large radii of curvature of the rear toe-engaging surface of the portion 17 of the plate 10 is conducive to proper fitting of the plate to toes as, in the frequent replacement of horse shoes, the lower face or toe of the hoof is worn away to a large radii of curvature by rasping of the hoof in the horse-shoeing operation, and also by sand and other abrasive materials during racing of the horse, to cause this toe portion of the hoof to conform to the portion 17 of the plate. It is apparent that the rear toe-engaging surface of the foot portion 17, in properly fitting the lower face or toe of the hoof, also will, due to its close conformation of its radii of transverse curvature to the lower face or toe of the hoof and engagement therewith, be effective to seal the toe of the hoof against the forcible entrance of any extraneous mud, sand, stones, or abrasive materials during pawing, stamping or other hoof action by the horse and without any possibility of such harmful matter entering between the plate 10 and the horse's hoof, or into the compensating channel 20 which is closed at its bottom by the foot portion 17 of the plate 10, to insure that mud, sand, stones, and the like, cannot forcibly enter or lodge between the hoof and plate to loosen the securing screws 22, 22 by wedging action provided by the repeated hammer-like forces on such material by the horse's hoof during pawing, stamping, pacing and trotting. It will be noted that the bottom of the plate 10 is usually located a short distance above the horseshoe for best results. The described and illustrated formation of the rear face of the plate, and the screw openings in the plate, are of considerable importance to the correct fitting of the plate to the toe of a hoof, particularly by the unskilled workman. It may be noted that the openings 23, 23 in the plate are countersunk to contain the heads of the screws 22, 22 for flush engagement of the screw heads with the curved front face of the plate.

A further important feature of the base plate 10 is that the wing portions 12, 12 and foot portion 17 have uniform and substantial thickness to insure the required strength and rigidity to withstand any stresses tending to bend the plate, while still being of light weight to permit the use of blocks of different weights to be assembled with the plate to provide a desired range of toe weight assemblies from 3 to 6 ounces.

In the event the assembly is to be secured to badly-shaped hoofs, the arcuate shaped recesses 21, 21 of the plate allow the toe-engaging sides of the wing portions 12, 12 of the plate to be easily filed to conform to the toes and thereby properly engage and fit the toes.

The front face of the plate is provided with an outwardly extending boss 24 of annular form to define a threaded opening 36, the boss projecting a substantial distance from the front face of the plate and being disposed centrally thereof. As seen in FIG. 4, the centers of the circular screw openings 23, 23 in the plate are located in a horizontal plane just below the boss 24. Above the boss 24 and located on the front face of the plate 10 is a projecting key or lug 26 which, as shown, is at the apex or peak 14 of the plate. The description of the just described features of the plate 10 is important in its relation to the weight block 11 which will now be described.

The weight member or block 11 is adapted to be employed to complete the toe-weight assembly and is formed to cooperate with and be secured to the base plate 10 in a manner to insure its ready attachment and removability while, in assembly, being so firmly fixed to the plate, that movement of the block relative to the plate, when the assembly is applied to the horse's hoof, cannot occur. More particularly, the block 11 is generally heart-shaped and having an area, as shown in FIG. 2, extending to the edges 13, 13 and 15, 15 of the plate 10 so that the angularly inclined arcuate lateral edges 27, 27 are disposed closely adjacent to these edges of the plate 10. The block 11 is formed with a rear laterally extending concave surface 28 adapted to be complementarily engaged with the front convex surface of the plate 10, as shown in FIG. 3. The concave surface of the block is interrupted by a recess 29 centrally located in the block and defining a circular pocket for receiving the boss 24 of the plate 10. The recess 29 has a wall 30 at its bottom provided with an opening 31. The boss 24 of the plate 10 is positioned in the recess 29 to provide, in cooperation with the opposed mating curved faces of the plate 10 and block 11, a considerable engagement area of the block and plate.

To maintain the plate and block in assembly, a flat-head screw 33 is provided and, as seen in FIGS. 2 and 3, the screw is inserted within an annular centrally located recess 34 in the convex surface 35 of the block 11 and passes through the wall 30, common to and having its opposite sides respectively defining the bottoms of the recesses 29 and 34 in the block, for threaded engagement with the opening 36 of the boss 22 of the plate 10 to secure the plate and block to each other, the screw being of such length as to have its end contained within the opening 23 of the boss 22. The screw is of the type employing a plug 37 of plastic, such as nylon, positioned in an opening in the screw and forming a portion of its threads to restrain unwanted rotation of the screw to hold the plate and block in assembly.

While the described laterally curved and complementary engaged surfaces of the assembled plate and block serve to hold the block and plate in their desired positions and should prevent rotation of the block relative to the plate, the key or lug 26 of the plate 10 is adapted to project and fit within a keyway or notch 38 in the rear surface of the block 11 and located and formed at the vertex of the edges 27, 27 of the block to positively prevent rotation of the block relative to the plate by any blows, or other action, by the horse which might otherwise rotate the block with possible loosening rotative motion of the screw 33 and throwing of the block by the horse.

It will be noted that this interlocking key and keyway arrangement provides a very simple and particularly effective connection as it is disposed at the apices of the plate and block and thereby located remotely spaced from the axis of any possible relative rotative movement of the plate and block.

While the present structure has been described in detail in a typical or preferred form or embodiment, it will be apparent to persons skilled in the art, after understanding the construction and assembly of the improvements contemplated herein that various changes and modifications thereof may be made without departing from the spirit and scope of the invention. It is contemplated in the appended claims to cover all such changes and modifications.

What is claimed is:

1. A toe weight assembly including a plate member having an arcuate curvature with the concave side thereof having a gradually decreasing radii from the top to the bottom thereof to conform to the convex curvature of the toe of a horse's hoof for engagement therewith, the convex side of said plate member having a centrally located cylindrical boss, said concave side of said plate member having a centrally disposed vertically extending grove defining a channel therein, said channel extending from the top of said plate member and terminating adjacent to but in spaced relation to the concavely curved surface portion of the bottom of the plate member and being of sufficient width to accommodate an irregular or misshapen toe of a hoof or a portion of a toe of a hoof having a convex curvature of less radii than that of the curvature of said concave side; a weight member having a concave rear surface conforming to and in engagement with the transversely curved convex surface of the plate member to inhibit rotation of the weight member relative to the plate member, said weight member being formed with a first cylindrical recess in the concave surface thereof receiving said boss and a centrally located second recess in the front surface thereof, said recesses being spaced by a wall having an opening therein; and a screw having its head disposed in said second recess and engaging said wall, the body of said screw extending through the opening in said wall, and being threaded into said boss to engage said concave rear surface of said weight member with the convex side of said plate member to insure maintaining said concave surface of said weight member in engagement with the convex side of said plate member to thereby prevent rotation of said weight member about the boss of said plate member, said plate and weight members respectively having an interengaging key and keyway for locating said members to position the members for full face engagement of their juxtaposed surfaces, said key and keyway being located in spaced relation to the boss of said plate member.

2. A toe weight assembly comprising a pointed spade-like plate member having a transversely extending arcuate curvature with the concave side thereof having gradually decreasing radii from the top point to and including the downwardly projecting bottom portion of said plate member to conform to and engage the toe of a horse's hoof, the convex side of said plate member having a centrally located cylindrical boss, said concave side of said plate member having a centrally disposed groove defining a channel therein extending vertically from the top point of said plate member and terminating at its lower end adjacent to but in spaced relation to the concave side of the downwardly projecting bottom portion of the plate member engageable with the toe of a horse's hoof, said channel being of sufficient width to accomodate an irregular or misshapen toe of a hoof or a portion of the toe of a hoof having a convex curvature of less radii than that of the curvature of said concave side of said plate member; a weight member generally heart-shaped to substantially conform to the shape of said plate member and having a concave rear surface in engagement with the convex surface of said plate member, said weight member being formed with a first annular recess in the concave surface thereof receiving said boss and a centrally located second annular recess in the front surface thereof, said recesses being spaced by a wall having an opening therein; and a screw having its head disposed in said second recess and engaging said wall, the body of said screw extending through the opening in said wall, and being threaded into said boss to engage said concave rear surface of said weight member with the convex side of said plate member, said plate and weight members respectively having an interengaging key and keyway for preventing relative rotation of said members about said boss, said key and keyway being located in spaced relation to the boss of said plate member.

References Cited in the file of this patent
UNITED STATES PATENTS

| | | |
|---|---|---|
| 425,474 | Van Etten | Apr. 15, 1890 |
| 431,802 | Clark | July 8, 1890 |
| 450,826 | Long | Apr. 21, 1891 |
| 456,146 | Henderson | July 21, 1891 |
| 498,955 | Hodgkins | June 6, 1893 |
| 503,404 | Buechner | Aug. 15, 1893 |
| 859,685 | McNalley et al. | July 9, 1907 |
| 882,837 | Norton | Mar. 24, 1908 |
| 1,064,031 | Tuttle | June 10, 1913 |